(12) United States Patent
Yamamoto et al.

(10) Patent No.: US 8,138,636 B2
(45) Date of Patent: *Mar. 20, 2012

(54) FUNCTION UNIT FOR DUAL WIRING SYSTEM

(75) Inventors: Masahiro Yamamoto, Kobe (JP); Takeshi Ueno, Kobe (JP); Kazufumi Oogi, Ibaraki (JP); Kenichi Yoneyama, Portland, OR (US); Hideshi Hamaguchi, Beaverton, OR (US)

(73) Assignee: Panasonic Electric Works Co., Ltd., Kadoma-shi (JP)

(*) Notice: Subject to any disclaimer, the term of this patent is extended or adjusted under 35 U.S.C. 154(b) by 660 days.

This patent is subject to a terminal disclaimer.

(21) Appl. No.: 11/988,313

(22) PCT Filed: Dec. 22, 2005

(86) PCT No.: PCT/JP2005/024199
§ 371 (c)(1),
(2), (4) Date: Apr. 8, 2008

(87) PCT Pub. No.: WO2007/001431
PCT Pub. Date: Jan. 18, 2007

(65) Prior Publication Data
US 2009/0051505 A1 Feb. 26, 2009

(30) Foreign Application Priority Data

Jul. 8, 2005 (JP) .................. 2005-200990
Jul. 8, 2005 (JP) .................. 2005-200991
Jul. 8, 2005 (JP) .................. 2005-200992
Jul. 8, 2005 (JP) .................. 2005-200993
Jul. 8, 2005 (JP) .................. 2005-200994

(51) Int. Cl.
*H01B 7/30* (2006.01)
(52) U.S. Cl. .................................................. 307/147
(58) Field of Classification Search .......... 307/326, 307/147
See application file for complete search history.

(56) References Cited

U.S. PATENT DOCUMENTS 2,433,917 A 1/1948 William
(Continued)

FOREIGN PATENT DOCUMENTS

DE 29504491 6/1995
(Continued)

OTHER PUBLICATIONS

Written Opinion of the International Searching Authority for PCT/JP2005/024200.
(Continued)

*Primary Examiner* — Robert L. Deberadinis
(74) *Attorney, Agent, or Firm* — Edwards Wildman Palmer LLP

(57) ABSTRACT

A function unit having easy exchangeability in a dual wiring system is provided. The function unit is detachably connected to a gate device mounted in a wall surface of a structure, and connected to both of an electric power line and an information line previously installed in the structure. The function unit has at least one of functions for supplying electric power from the electric power line, outputting information from the information line and inputting information into the information line when connected with the gate device. The function unit has a module connector, which is configured to simultaneously establish both of supplying the electric power from the gate device to the function unit, and making a signal transmission between the gate device unit and the function unit when connected to a module port formed at the gate device. To improve function expandability, an additional function unit may be detachably connected to the function unit.

6 Claims, 8 Drawing Sheets

U.S. PATENT DOCUMENTS

| | | | |
|---|---|---|---|
| 3,609,647 | A | 9/1971 | Castellano |
| 3,879,101 | A | 4/1975 | McKissic |
| 4,665,544 | A | 5/1987 | Honda et al. |
| 4,725,249 | A | 2/1988 | Blackwood et al. |
| 4,842,551 | A | 6/1989 | Heimann |
| 5,114,365 | A | 5/1992 | Thompson et al. |
| 5,359,143 | A | 10/1994 | Simon et al. |
| 5,383,799 | A | 1/1995 | Fladung |
| 5,539,821 | A | 7/1996 | Blonder |
| 5,650,771 | A | 7/1997 | Lee |
| 6,002,937 | A | 12/1999 | Young et al. |
| 6,036,516 | A | 3/2000 | Byrne |
| 6,369,707 | B1 | 4/2002 | Neer |
| 6,379,182 | B1 | 4/2002 | Byrne |
| 6,420,964 | B1 | 7/2002 | Nishikawa et al. |
| 6,429,779 | B1 | 8/2002 | Petrillo et al. |
| 6,544,049 | B1 | 4/2003 | Pierson, Jr. |
| 6,624,532 | B1 | 9/2003 | Davidow et al. |
| 6,759,759 | B2 | 7/2004 | Kojima et al. |
| 6,778,308 | B2 | 8/2004 | Otsuka et al. |
| 6,855,881 | B2 | 2/2005 | Khoshnood |
| 6,904,149 | B2 | 6/2005 | Keenum et al. |
| 6,993,417 | B2 | 1/2006 | Osann, Jr. |
| 7,034,225 | B2 | 4/2006 | Thompson et al. |
| 7,194,639 | B2 | 3/2007 | Atkinson et al. |
| 7,420,459 | B2 | 9/2008 | Pruchniak |
| 7,425,677 | B2 | 9/2008 | Gates et al. |
| 7,697,268 | B2 | 4/2010 | Johnson et al. |
| 7,761,555 | B1 | 7/2010 | Bishel |
| 7,772,717 | B2 * | 8/2010 | Kitamura et al. ............... 307/38 |
| 2001/0046815 | A1 | 11/2001 | Luu |
| 2003/0050737 | A1 | 3/2003 | Osann, Jr. |
| 2004/0121648 | A1 | 6/2004 | Voros |
| 2005/0076148 | A1 | 4/2005 | Chan et al. |
| 2005/0094786 | A1 | 5/2005 | Ossa |
| 2005/0126812 | A1 | 6/2005 | Plankell |
| 2006/0270284 | A1 | 11/2006 | Youden |
| 2009/0051505 | A1 | 2/2009 | Yamamoto et al. |
| 2009/0209136 | A1 | 8/2009 | Yamamoto et al. |

FOREIGN PATENT DOCUMENTS

| | | |
|---|---|---|
| DE | 29924724 | 3/2005 |
| EP | 0776108 | 5/1997 |
| JP | 58-060331 | 4/1983 |
| JP | 61-065555 | 4/1986 |
| JP | 64-002459 | 1/1989 |
| JP | 03-071581 A | 3/1991 |
| JP | 04-090293 | 3/1992 |
| JP | 06-078365 | 3/1994 |
| JP | 06-165338 A | 6/1994 |
| JP | 08-298690 | 11/1996 |
| JP | 10-012337 | 1/1998 |
| JP | 10-136104 | 5/1998 |
| JP | 10-208804 A | 8/1998 |
| JP | 10-304467 A | 11/1998 |
| JP | 11-187154 | 7/1999 |
| JP | 11-290402 | 10/1999 |
| JP | 2000-306643 A | 11/2000 |
| JP | 2000-348825 A | 12/2000 |
| JP | 2003-134681 | 5/2003 |
| JP | 2004-191883 | 7/2004 |
| JP | 2004-304617 | 10/2004 |
| KR | 1998-061153 | 11/1998 |
| WO | WO-2005/076871 A1 | 8/2005 |

OTHER PUBLICATIONS

International Search Report for PCT Application No. PCT/JP2005/023873 mailed Jan. 31, 2006.
International Search Report for PCT Application No. PCT/JP2005/024199 mailed Apr. 28, 2006.
Written Opinion of the International Searching Authority for PCT/JP2005/024199.
International Search Report for PCT Application No. PCT/JP2005/024200 mailed May 10, 2006.
International Search Report for PCT Application No. PCT/JP2005/024198 mailed Apr. 27, 2006.
Ris H R: "EIB-Bus-Europäischer Installationsbus Teil 2," Elektrotechnik, Vogel Verlag K.G. Wurzburg, DE, No. 7/8. Jan. 1993, pp. 61-67, XP000567405 ISSN: 1431-9578.
International Search Report for PCT Application No. PCT/JP2005/024194 mailed May 9, 2006.
Written Opinion of the International Searching Authority for PCT/JP2005/024194.
Written Opinion of the International Searching Authority for PCT/JP2005/024198.
Japanese Office Action dated Jan. 27, 2009 issued in JP 2006-515410.
Japanese Office Action mailed May 26, 2009, issued in Japanese Application No. 2006-515421 and the English translation thereof.
Japanese Office Action mailed Jan. 27, 2009, issued in Japenese Application No. 2006-515411 and the English translation thereof.
Korean Office Action mailed Jul. 17, 2009, issued in Korean Application No. 10-2008-7002541 and the English translation thereof.
Korean Examination Report dated Jan. 21, 2010, issued for the corresponding Korean patent application No. 10-2008-7002539.

* cited by examiner

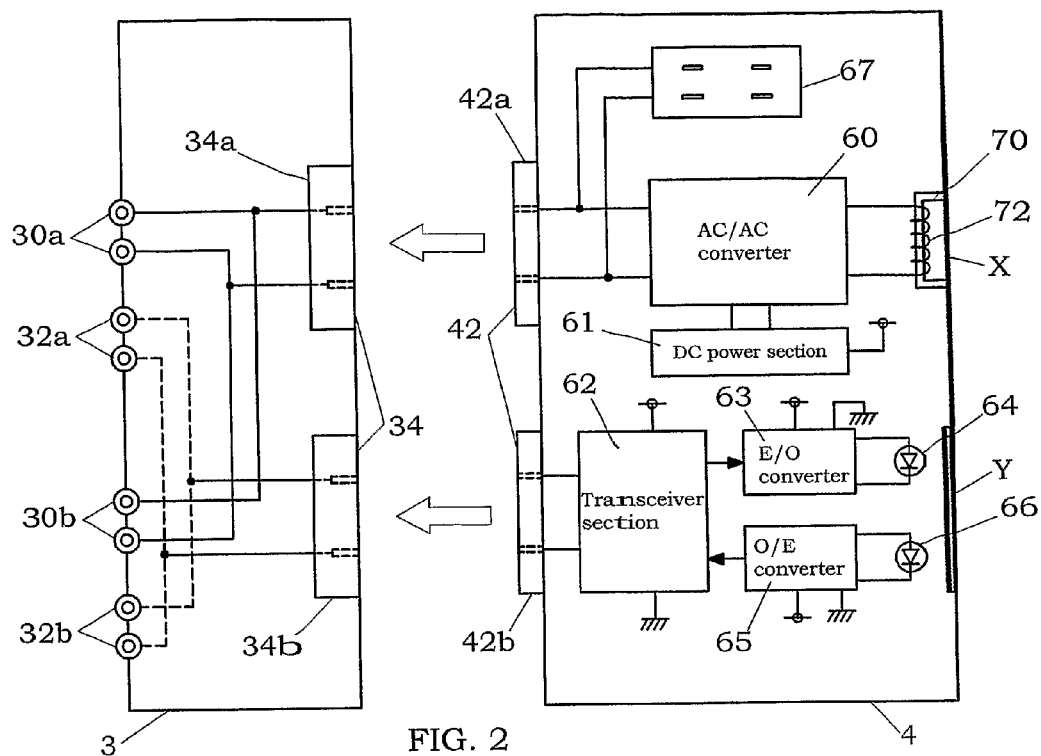
FIG. 2
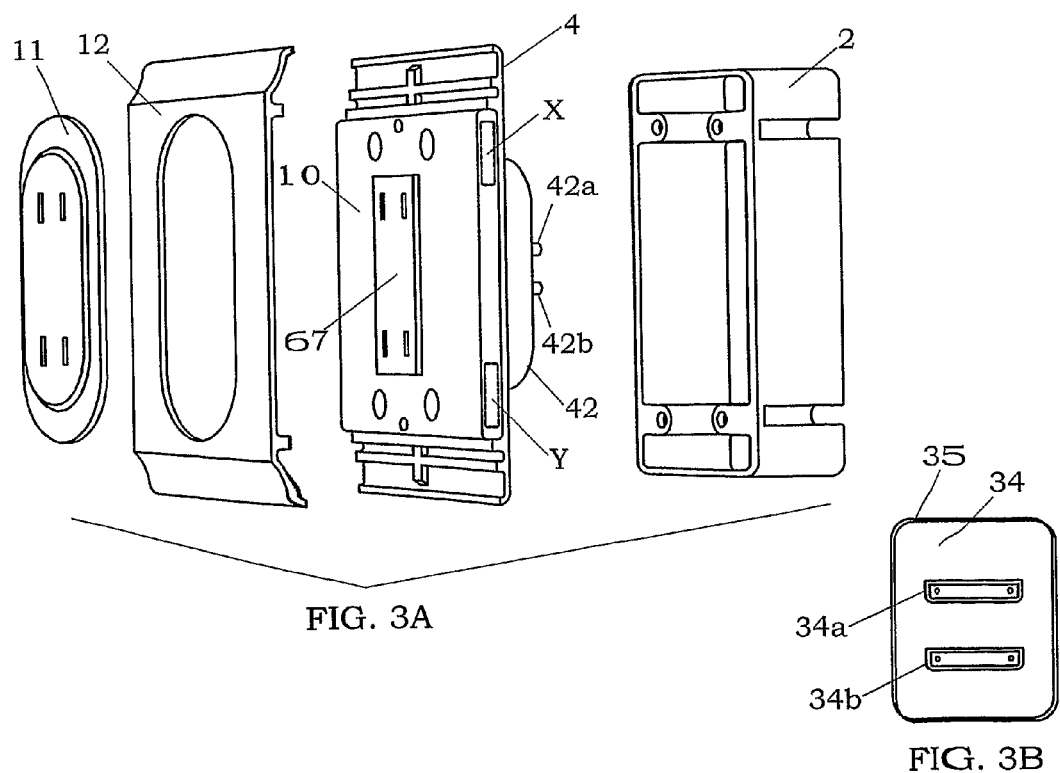
FIG. 3A
FIG. 3B

FUNCTION UNIT FOR DUAL WIRING SYSTEM

CROSS REFERENCE TO RELATED APPLICATIONS

This application is related to four applications: "BASE UNIT FOR DUAL WIRING SYSTEM" filed even date herewith in the names of Masahiro YAMAMOTO et al. as a national phase entry of PCT/JP2005/024200 filed Dec. 22, 2005; "DUAL WIRING SYSTEM" filed even date herewith in the name of Masahiro YAMAMOTO et al. as a national phase entry of PCT/JP2005/024194 filed Dec. 22, 2005; "DUAL WIRING SYSTEM" filed even date herewith in the name of Tsunehiro KITAMURA et al. as a national phase entry of PCT/JP2005/023873 filed Dec. 27, 2005; and "FUNCTION UNIT FOR DUAL WIRING SYSTEM" filed even date herewith in the name of Masahiro YAMAMOTO et al. as a national phase entry of PCT/JP2005/024199 filed Dec. 22, 2005; all of which claim Japan application Nos. 2005-200990, 2005-200991, 2005-200992, 2005-200993, and 2005-200994 all filed Jul. 8, 2005, which applications are assigned to the assignee of the present application and all four incorporated by reference herein.

TECHNICAL FIELD

The present invention relates to a dual wiring system, which can be used for the supply of electric power and the input and output of information through an electric power line and a signal line installed in a structure.

BACKGROUND ART

Due to popularization of the Internet, it has been demanded to ensure the accessibility to information networks at many locations in building structures such as general houses and office buildings. For example, Japanese Patent Early Publication [kokai] No. 11-187154 discloses a multimedia wiring system having a distribution board for controlling an electric power line and various kinds of signal lines installed in a structure in a centralized control manner, and a multimedia receptacle panel, which is adapted in use to be mounted in an indoor wall surface, and connected to the distribution panel through the electric power line and the signal lines. For example, the multimedia receptacle panel has a power receptacle for supplying commercial electric power to an electric appliance, receptacle for receiving broadcasting programs such as ground wave broadcasting, satellite broadcasting, and cable television, modular jacks for analog and digital lines used for the Internet and telephone communication. By use of this multimedia wiring system, the convenience of multimedia products is enhanced to obtain comfortable living and working environments in the information society.

By the way, the above-described multimedia receptacle panel is usually mounted in the wall surface, and connected to the electric power line and the signal lines under construction works of the building structures. This means that the functions of the multimedia receptacle panel are determined at the time of the construction works. Therefore, after the construction works are finished, it is difficult to add a new function to the multimedia receptacle panel or exchange a part of the functions of the existing multimedia receptacle panel for another function. In addition, when exchanging the existing multimedia receptacle panel for another multimedia panel, a repair work is needed. However, such a repair work is not easy for general users to perform, and the costs of the repair work become a burden to the user.

Thus, the conventional multimedia receptacle panel still has plenty of room for improvement from the viewpoints of easy exchangeability and function expandability.

SUMMARY OF THE INVENTION

Therefore, a primary concern of the present invention is to provide a function unit with improved function expandability and easy exchangeability in a dual wiring system.

That is, the function unit for dual wiring system of the present invention is adapted in use to be detachably connected to a gate device mounted in a wall surface of a structure, and connected to both of an electric power line and an information line installed in the structure. The function unit is configured to provide at least one of functions for supplying an electric power from the electric power line, outputting information from the information line, and inputting information into the information line when connected with the gate device. The function unit is characterized by having one of a module connector and a module port, which is configured to simultaneously establish both of supplying the electric power from the gate device to the function unit, and making a signal transmission between the gate device unit and the function unit when connected to the other one of the module connector and the module port formed at the gate device.

According to the present invention, since both of the supply of electric power from the gate device to the function unit and the mutual communication of the information signal between the gate device and the function unit can be simultaneously obtained by the connection between the module connector and the module port, a general user can easily exchange the function unit already connected to the gate device for another function unit without performing a laborious repair work. In addition, when a plurality of gate devices are mounted in wall surfaces at plural locations in the structure, each of the gate devices are sharable among a plurality of function units having various kinds of functions such as receptacle, switch, sensor, controller, monitor and speaker. Therefore, an increased degree of freedom of layout of the function units provides comfortable and convenient living and working environments to meet the user's needs.

In the present invention, it is preferred that the function unit has at least one of a power supply unit configured to supply the electric power provided by the connection between the module connector and the module port to an electric appliance by means of electromagnetic coupling, and a transceiver unit configured to convert an information signal provided by the connection between the module connector and the module port into an optical signal and output the optical signal, and convert an optical signal provided from outside to an information signal and transmit the information signal to the information line through the gate device. In this case, since the electric power transmission and/or the signal transmission are performed in a noncontact manner by means of the electromagnetic and optical couplings, it is possible to minimize transmission loss of the electric power and/or the electric signal, and operate the function unit with reliability.

In addition, it is preferred that the function unit has one of an electric power port and an electric power connector, which is detachably connected to the other one of the electric power port and the electric power connector formed at an additional function unit to supply the electric power from the function unit to the additional function unit, and one of an information signal port and an information signal connector, which is detachably connected to the other one of the information signal port and the information signal connector formed at the additional function unit to make a signal transmission between the function unit and the additional function unit. In particular, it is preferred that the electric power port and the electric power connector are configured to supply the electric power from the function unit to the additional function unit by means of electromagnetic coupling, and the information signal port and the information signal connector are configured to make the signal transmission between the function unit and the additional function unit by means of optical coupling. The availability of the additional function unit further increases the function expandability in the dual wiring system.

Moreover, it is preferred that the function unit has a joining means configured to mechanically connect the additional function unit to the function unit. For example, the joining means is formed with an engaging portion such as elongated projection and groove formed on the function unit, and a joining member configured to slidably contact the engaging portion. A region of the joining member can be engaged to the engaging portion of the function unit, and the remaining region of the joining member is engaged to an engaging portion formed on the additional function unit, so that the mechanical connection between the function unit and the additional function unit is achieved. In this case, it is possible to improve the reliability of the supply of electric power and the mutual communication of the information signal between the function unit and the additional function unit, and prevent an accidental falling of the additional function unit from the function unit.

These and additional features of the present invention and advantages brought thereby will become more apparent from the following preferred embodiments, referring to the attached drawings.

BRIEF EXPLANATION OF THE DRAWINGS

FIG. 2 is a schematic circuit diagram of a gate device and a function unit for the dual wiring system;

FIG. 3A is an exploded perspective view of the function unit, and FIG. 3B is a plan view of a module port of the gate device;

DETAIL DESCRIPTION OF PREFERRED EMBODIMENTS OF THE INVENTION

A function unit for dual wiring system of the present invention is explained in detail according to the following preferred embodiments.

Figure 1:
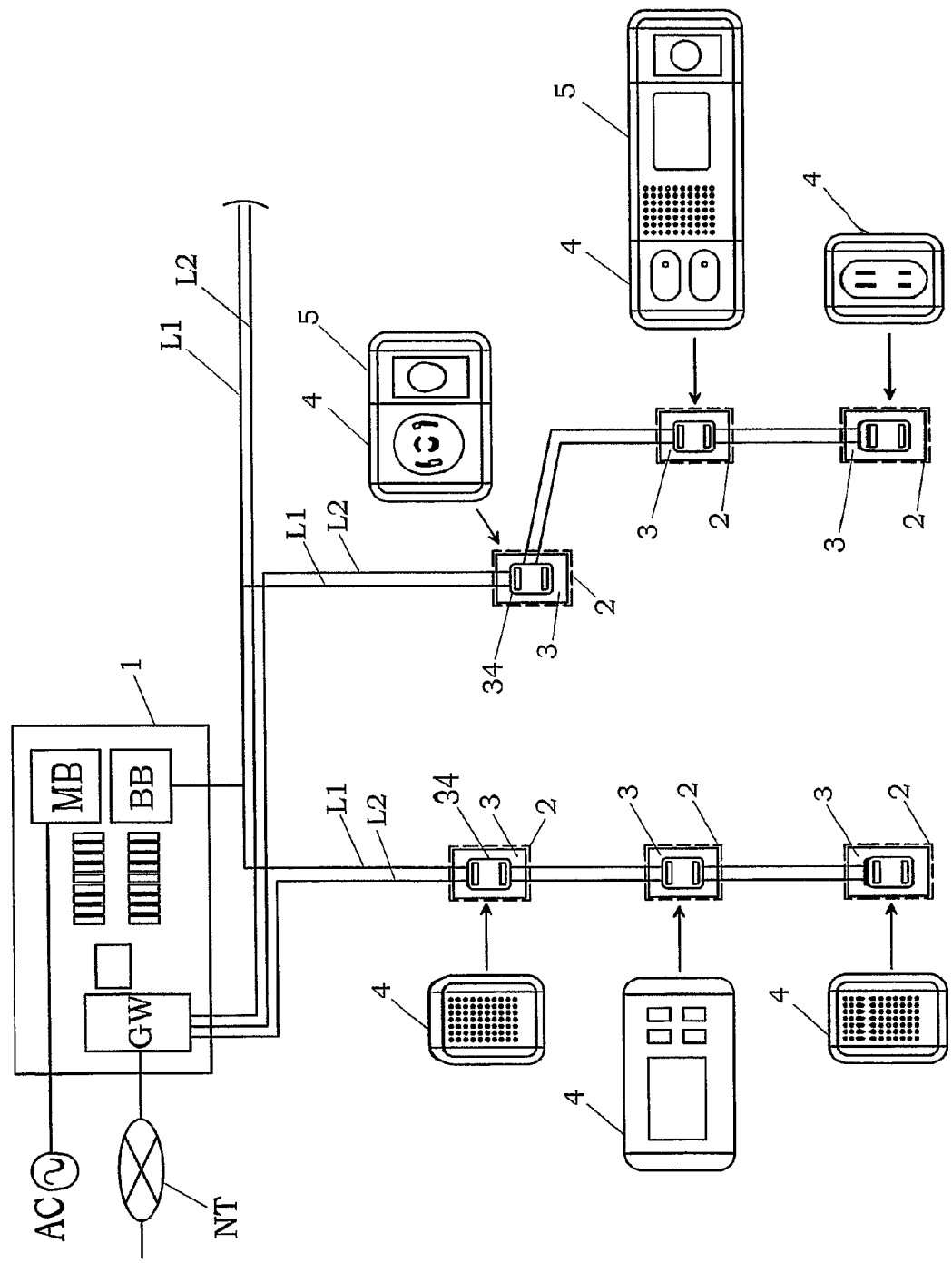
FIG. 1 is a schematic diagram of a dual wiring system according to a preferred embodiment of the present invention.

As shown in FIG. 1, the dual wiring system of this embodiment has a power supply line L1 and an information line L2 installed in a building structure, which are connected to commercial power source AC and the internet network NT through a distribution board 1, switch boxes 2 embedded in wall surfaces at many locations in the building structure, gate devices 3 mounted in the switch boxes and connected to the power supply line L1 and the information line L2, and a plurality of function units 4 each having the capability of providing at least one of functions for supplying electric power from the power supply line L1, outputting information from the information line L2 and inputting information into the information line L2 when connected with one of the gate devices 3. In the present specification, the wall is not limited to the sidewall formed between adjacent rooms. That is, the wall includes exterior wall and interior wall of the building structure, and the interior wall includes the sidewall, ceiling and floor. In FIG. 1, "MB" designates a main breaker, "BB" designates a branched breaker, and "GW" designates a gateway (e.g., router or built-in hub).

As shown in FIG. 2, each of the gate devices 3 has terminals (30a, 32a) connected to the power supply line L1 and the information line L2, and bus-wiring terminals (30b, 32b) at its rear surface, and a module port 34 at its front surface, which is composed of an electric power port 34a for supplying the electric power and an information signal port 34b for accessing the information line. For example, as shown in FIG. 3B, each of the electric power port 34a and the information signal port 34b is configured in a substantially rectangular shape such that they are arranged in parallel to each other. As described later, the module port 34 is detachably connected to a module connector 42 of the function unit 4. The module port 34 may be formed at a side of the gate device 3 such that the function unit 4 is detachably connected to the gate device 3 in a direction along the wall surface (i.e., in substantially parallel with the wall surface).

With respect to the gate devices 3, a distance between the electric power port 34a and the information signal port 34b, terminal arrangements in each of the electric power port 34a and the information signal port 34b, and the shape of the module port 34 are standardized (stylized) to make each of the gate devices 3 shareable among the function units 4. In other words, since the module ports 34 of the gate devices 3 are formed to be equal to each other, the function unit 4 having the module connector 42 connectable with the module port 34 can be commonly used for all of the gate devices 3 in the dual wiring system. Thus, the function unit 4 connected to one of the gate devices 3 can be exchanged with another function unit 4 by a simple operation of connecting and disconnecting between the module port 34 and module connector 42 without performing a repair work. Therefore, the dual wiring system of the present invention is excellent in easy exchangeability of the function unit 4.

Figure 4:
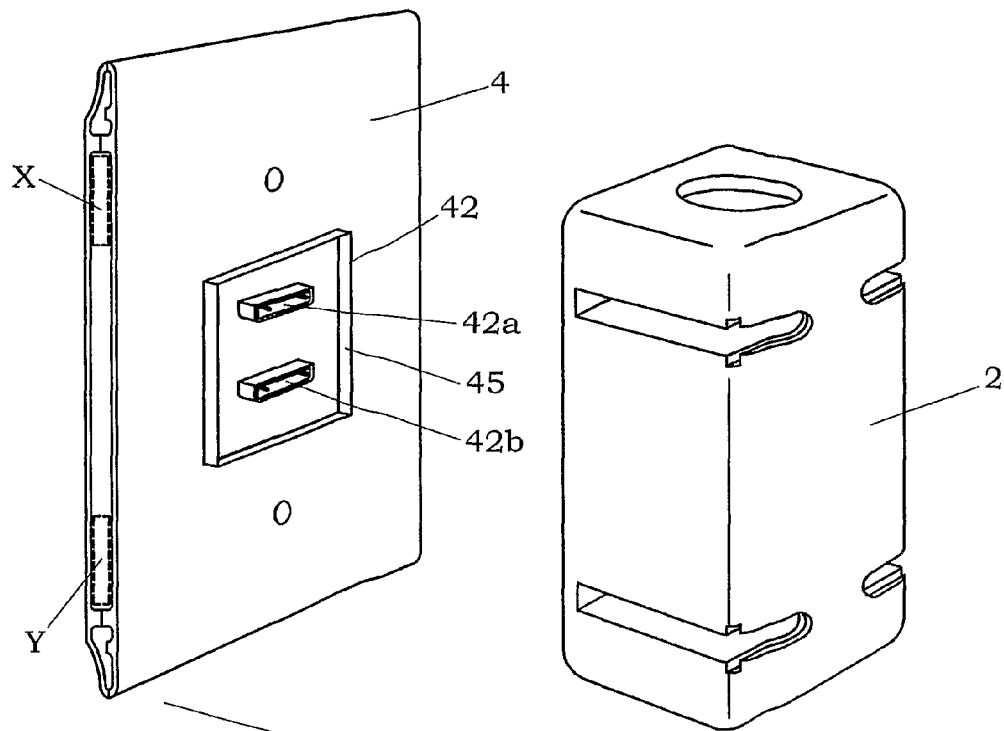
FIG. 4 is a perspective view of the function unit (viewed from the rear side)

The function unit 4 of this embodiment has circuit components shown in FIG. 2 therein, and the module connector 42 in its rear surface, as shown in FIG. 3A. The module connector 42 is composed of an electric power connector 42*a* and an information signal connector 42*b*. For example, as shown in FIG. 4, each of the electric power connector 42*a* and the information signal connector 42*b* is configured in a substantially rectangular shape such that they are arranged in parallel to each other. By connecting the module connector 42 of the function unit 4 to the module port 34 of the gate device 3, the electric power connector 42*a* and the information signal connector 42*b* can be simultaneously connected to the electric power port 34*a* and the information signal port 34*b*.

In this embodiment, the module port 34 also has a guide portion 35 such as a ring-like wall or a ring-like groove extending around the electric power port 34*a* and the information signal port 34*b*. This guide portion 35 is formed to be engageable to an engaging portion 45 such as a ring-like wall of the module connector 42, which is formed on the rear surface of the function unit 4. Since the electric power connector 42*a* and the information signal connector 42*b* are simultaneously connected to the electric power port 34*a* and the information signal port 34*b* by simply engaging the engaging portion 45 to the guide portion, it is possible to improve the removability of the function unit 4. The module port 34 and the module connector 42 may be formed by female and male connectors.

The electric power provided to the function unit 4 through the gate device 3 and the mutual communication of the information signal between the function unit 4 and the information line L2 are used for various purposes according to the kind of the function unit 4. For example, when the function unit 4 is connected to the gate device 3 mounted in the wall surface at a high position near the ceiling, it preferably has a receptacle function of receiving a plug with hook of a lighting apparatus, security function such as a motion sensor, temperature sensor, and monitoring camera, or a sound function such as speaker. In addition, when the function unit 4 is connected to the gate device 3 mounted in the wall surface at a middle height, at which the function unit 4 can be easily operated by the user, it preferably has a switch function of turning on/off the lighting apparatus, control function for electric appliances such as air-conditioning equipments, or display function such as liquid crystal display. In addition, when the function unit 4 is connected to the gate device 3 mounted in the wall surface at a low position near the floor, it preferably has a receptacle function for receiving a plug of an electric appliance such as electric vacuum cleaner, the sound function such as speaker, or a footlight function.

Next, an internal structure of the function unit 4 of this embodiment is explained. As shown in FIG. 2, the function unit 4 is provided with an AC/AC converter 60, DC power section 61, transceiver section 62, E/O converter 63, O/E converter 65, and a function section 67. The AC/Ac converter 60 converts commercial AC voltage to a lower AC voltage having an increased frequency, and applies the lower AC voltage to a coil 72 wound around a core 70. The DC power section 61 generates an operating voltage of the internal circuit components from a stable DC voltage obtained by rectifying and smoothing the lower AC voltage. The transceiver section 62 transmits and receives the information signal for enabling the mutual communication through the information line L2. The E/O converter 63 converts the information signal received from the information line L2 to an optical signal, and outputs the optical signal though a light emitting device (LED) 64. On the other hand, the O/E converter 65 receives the optical signal provided from the outside, e.g., an additional function unit 5 described later by a light receiving device (PD) 66, and converting the received optical signal into the information signal to transmit it to the transceiver section 62. The function section 67 provides the above-described function of the function unit 4. In the case of FIG. 2, the function section 67 is formed by power receptacles.

Figure 5:
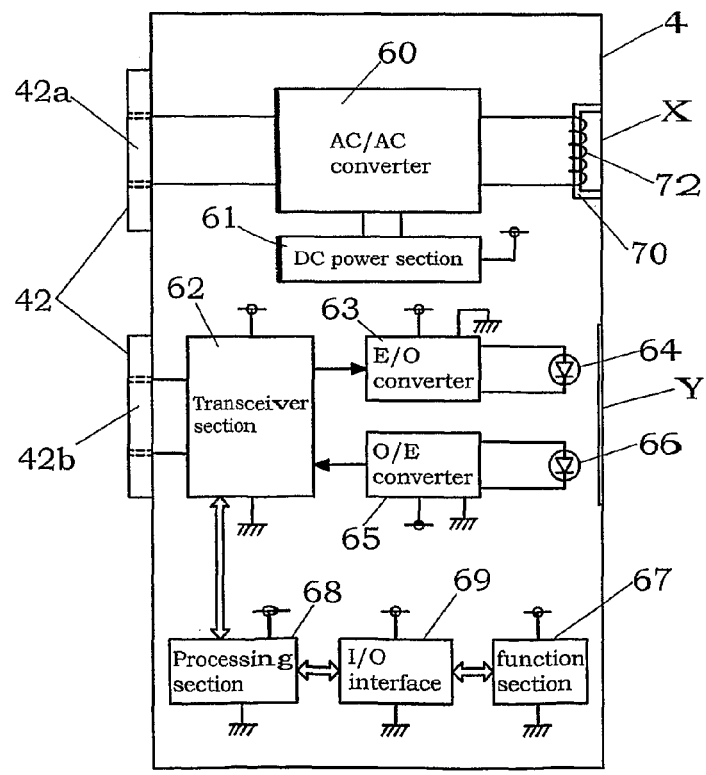
FIG. 5 is a schematic circuit diagram of another function unit.

In the case of the function unit 4 having another function section 67 such as sensor or controller, a processing section 68 and I/O interface 69 are formed between the transceiver section 62 and the function section 67, as shown in FIG. 5. The processing section 68 has functions of performing a signal processing of the information signal received by the transceiver section 62 to transmit the processed signal to the function section 67 through the I/O interface 69, and receiving the data signal provided from the function section 67 to output as the information signal. Electric power needed to energize the transceiver section 62, processing section 68 and the function section 67 is supplied from the DC power section 61. When an AC/DC converter for converting the commercial AC voltage into a required DC voltage is used in place of the AC/AC converter 60, the DC power section 61 can be omitted.

When the function section 67 is formed by a switch, operation data obtained by operating the switch is transmitted to the processing section 68 through the I/O interface 69. Then the processed data is sent to, for example, an infrared remote controller (not shown) through the transceiver section 62, so that an electric appliance to be controlled is turned on/off by receiving a remote control signal emitted from the infrared remote controller. In addition, when the function section 67 is formed by a sensor, data detected by the sensor is transmitted as the information signal to the information line L2, and then informed to the user by a required communicator. When the function section 67 is formed by a speaker, sound data provided as the information signal through the information line L2 is output from the speaker. When the function section 67 is formed by a monitoring camera, compression encoding of image data taken by the monitoring camera is performed, and then output as the information signal. Furthermore, when the function section 67 is formed by a monitor, image data provided through the information line L2 is decoded, and then displayed on the monitor. When the function section 67 is simply formed by the power receptacle, as described above, the processing section 68 and the I/O interface 69 can be omitted. Thus, since the function units 4 having various kinds of the function sections 67 can be detachably used in the dual wiring system, the degree of freedom of layout of the function units 4 can be remarkably improved.

Figure 6:
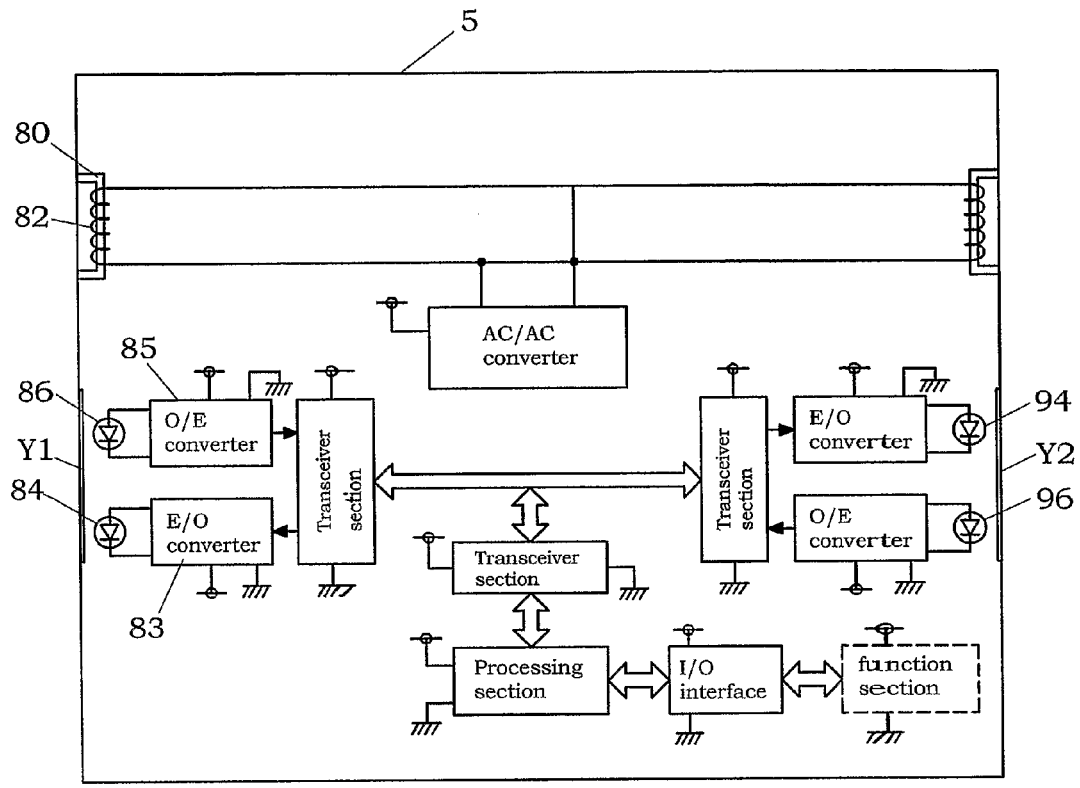
FIG. 6 is a schematic circuit diagram showing the internal structure of an additional function unit for the dual wiring system.

The coil 72 wound around the core 70 in the function unit 4 is used as a power supply means for supplying electric power from the function unit 4 to the additional function unit 5 in a noncontact manner. That is, the coil 72 wound around the core 70 of the function unit provides an electromagnetic coupling portion that works as a first side of a transformer. On the other hand, as shown in FIG. 6, the additional function unit 5 has an electromagnetic coupling portion comprised of a coil 82 wound around a core 80, which works as a second side of the transformer. Therefore, by forming electromagnetic coupling between the function unit 4 and the additional function unit 5, a low AC voltage is induced in the coil 82 of the additional function unit 5 to achieve the supply of electric power from the function unit 4 to the additional function unit 5. In this embodiment, since the low. AC voltage having the higher frequency than the commercial AC voltage is obtained by the AC/AC converter 60, the electromagnetic coupling portions used as the transformer can be downsized.

In addition, the light emitting device (LED) 64 of the E/O converter 63 of the function unit 4 is used to transmit the optical signal as the information signal to the additional function unit 5 in a noncontact manner. In this case, as shown in FIG. 6, a light receiving device (PD) 86 is disposed in the additional function unit 5 such that the light emitting device 64 of the function unit 4 is in a face-to-face relation with the light receiving device 86 of the additional function unit 5 when the additional function unit 5 is connected to the function unit 4. Similarly, to transmit the optical signal as the information signal from the additional function unit 5 to the function unit 4, the additional function unit 5 has a light emitting device (LED) 84, which is disposed to be in the face-to-face relation with the light receiving element (PD) 66 of the function unit 4 when the additional function unit 5 is connected to the function unit 4. Thus, each of the function unit 4 and the additional function unit 5 has the pair of the E/O converter (63, 83) and the O/E converter (65, 85) as an optical coupling portion to enable the mutual communication of the information signal therebetween.

As shown in FIGS. 3A and 4, it is preferred that the electromagnetic coupling portion X used for the supply of electric power and the optical coupling portion Y used for the mutual communication of the information signal are disposed at a side surface of the function unit 4 to be spaced from each other by a required distance. In addition, the pair of the electromagnetic coupling portion X and the optical coupling portion Y are formed at each of both sides of the additional function unit 5, as shown in FIG. 6. That is, the optical coupling portion Y1 formed at one side (e.g., left side) of the additional function unit 5 is composed of the light receiving device 86 located at the upper side and the light emitting device 84 located at the lower side, and the optical coupling portion Y2 formed at the opposite side (e.g., right side) of the additional function unit 5 is composed of a light emitting device 94 located at the upper side and a light receiving device 96 located at the lower side. In this case, even when a plurality of additional function units 5 are connected in series to the function unit 4, it is possible to ensure the mutual communication of the information signal between the additional function units 5 as well as between the function unit 4 and the additional function unit 5. It is also preferred that a light transparent cover is attached to the respective optical coupling portion (Y, Y1, Y2) to protect the optical devices. As shown in FIG. 6, the additional function unit 5 further has circuit components for achieving the power supply and the mutual communication of the information signal between adjacent additional function units 5. However, since they are substantially the same as the circuit components used in the function unit 4, duplicate explanations of the same circuit components are omitted.

As shown in FIG. 3A, when the function section 67 (e.g., power receptacle) is formed at the front surface (i.e., the opposite surface to the rear surface having the module connector 42) of the function unit 4, and the pair of the electromagnetic coupling portion X and the optical coupling portion Y is formed at the side surface of the function unit 4, the additional function units 5 can be connected to the function unit 4 along the wall surface (i.e., in parallel with the wall surface). Therefore, it is possible to improve function expandability in the dual wiring system without spoiling the beauty in the interior spaces. In addition, the gate device 3 may be fixed to the switch box 2 such that a part of the gate device 3 is projected form the wall surface. In this case, the module port 34 is preferably formed at a side of the projected portion of the gate device 3, so that the function unit 4 and the additional function units 5 can be arranged along the wall surface.

Figures 7A, 7B:
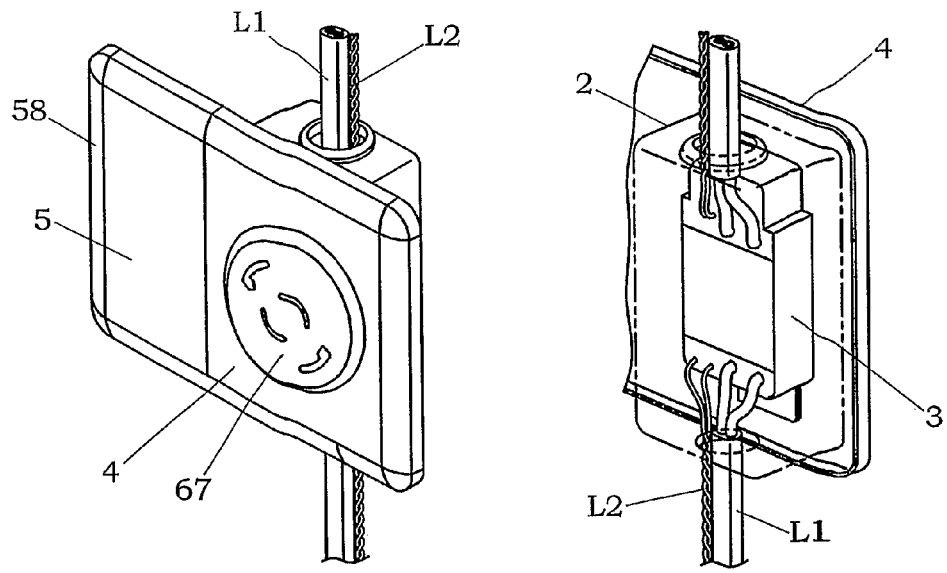
FIGS. 7A and 7B are front and rear perspective views of the additional function unit connected to the function unit.

Examples of the additional function unit(s) connected to the function unit are introduced below. In FIGS. 7A and 7B, the function unit 4 has a special receptacle for a plug with hook of a lighting apparatus as the function section 67. The additional function unit connected to the function unit has a function of emitting an infrared remote signal. In this case, operation data obtained when another function unit having a controller as the function section is operated by a user is transmitted to the additional functional unit 5 of FIG. 7A through the information line L2, so that the infrared remote signal is emitted toward an infrared signal receiving portion of an electric appliance such as air-conditioning equipment. In FIG. 7A, the numeral 58 designates a protection cover detachably attached to the side of the additional function unit 5 to protect the electromagnetic coupling portion X and the optical coupling portion Y when not used. In addition, when the function unit 4 has the power receptacle, a relay or a semiconductor switch may be connected to a circuit for the power receptacle such that the function of the power receptacle can be cancelled when the relay or the semiconductor switch is operated according to a control signal transmitted from another function unit.

Figure 8:
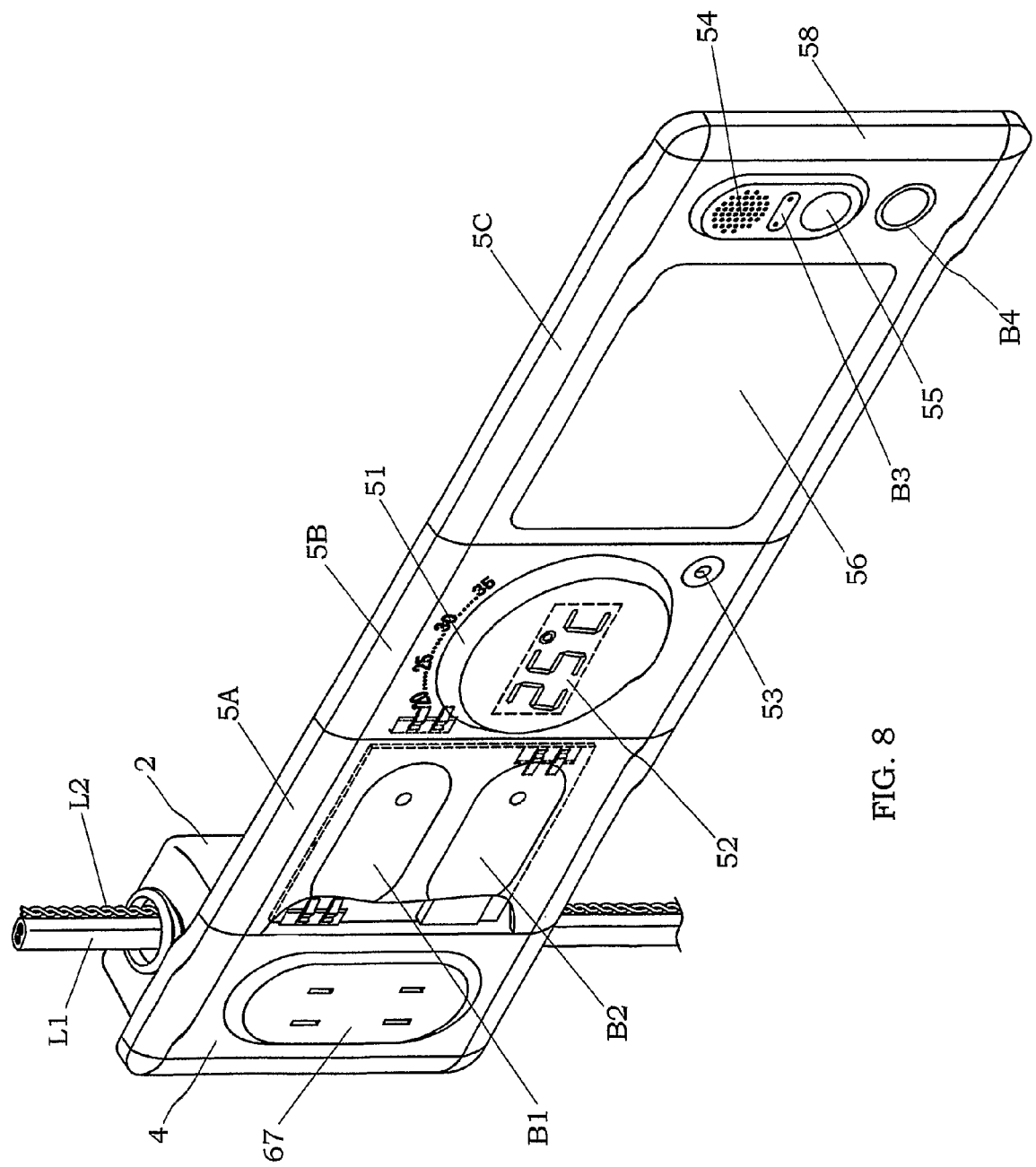
FIG. 8 is a perspective view of the additional function units connected to the function unit.

In FIG. 8, first to third additional function units (5A, 5B, 5C) are connected to the function unit 4. In this case, the function unit 4 has general power receptacles as the function section 67. The first additional function unit 5A detachably connected to the function unit 4 has switches for turning on/off an air-conditioning equipment as the function section. The second additional function unit 5B detachably connected to the first additional function unit 5A has a controller of the air-conditioning equipment as the function section. In addition, the third additional function unit 5C detachably connected to the second additional function unit 5B has a main unit of an intercom system as the function section.

The first additional unit 5A is provided with an operation button B1, stop button B2, and a CPU section for preparing the data according to the operation of these buttons and transmitting the prepared data to the processing section through the I/O interface. This additional function unit is preferably used to operate a lighting apparatus. The second additional function unit 5B is provided with a temperature setting dial 51 for the air-conditioning equipment, LCD (liquid crystal display) monitor 52 for displaying the setting temperature, timer switch 53 for operating the air-conditioning equipment for a desired time period, and a CPU section for preparing operation data according to the operation of the temperature setting dial 51 and the operation of the timer switch 53, transmitting the operation data to the processing section through the I/O interface, and preparing the data to be displayed on the LCD monitor 52.

The third additional function unit 5C is provided with a volume control button B3, speaker 54, mode switch 55 for switching between the transmitter function and the receiver function of the speaker 54, LCD screen 56 for displaying the image taken by a TV camera placed at the entrance, release button B4 for releasing the door lock, and a CPU section having a sound processing function for the speaker 54, image processing function for the LCD screen 56, and the functions of preparing operation data according to the operations of the release button B4 and the mode switch 55, and transmitting the prepared operation data to the processing section through the I/O interface. The function sections of the additional function units 5 are not limited to the above examples. For example, a battery charger for electric shaver, electric toothbrush, mobile phone and portable audio player may be formed as the function section. In addition, the additional function unit 5 having a handset function of the intercom system may be connected to the function unit 4 mounted in an exterior wall surface at the entrance.

Figure 9:
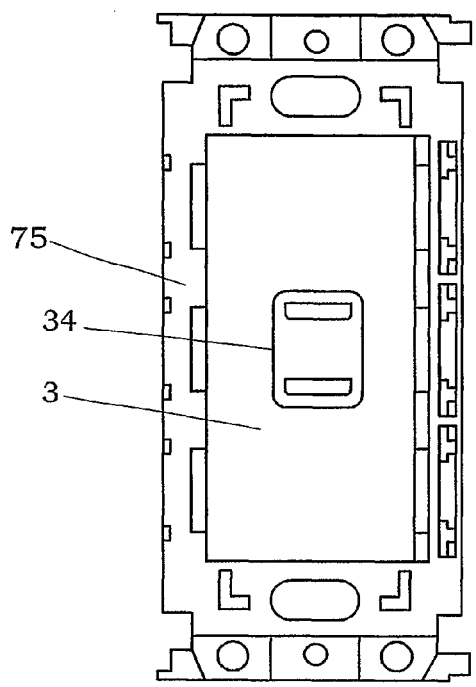
FIG. 9 is a plan view of an attachment plate for fixing the gate device to a switch box.

In the above explanation, the gate device 3 is directly fixed to the switch box 2. If necessary, the gate device 3 may be fixed to the switch box 2 through an attachment plate 75, for example, as shown in FIG. 9. In this case, after hooks formed at both sides of the attachment plate 75 are engaged to the gate device 3, the attachment plate 75 with the gate device 3 is fixed to the switch box 2 by use of mounting screws. Alternatively, the gate device 3 may be directly fixed in the wall surface by use of exclusive clamps without using the switch box 2. On the other hand, the function unit 4 can be attached to the wall surface by connecting the module connector 42 to the module port 34 of the gate device 3 in the switch box 2, then fixing a housing 10 of the function unit 4 to the switch box 2 by use of mounting screw, and finally fitting a receptacle cover 11 and a cosmetic cover 12 to the front surface of the housing 10. Thus, a general user can easily finish the exchanging operation of the function unit 4 without performing a repair work.

Figure 10B:
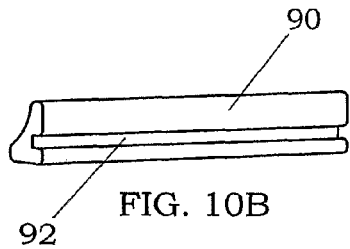
FIG. 10B is a perspective view of a joining member.
Figure 10A:
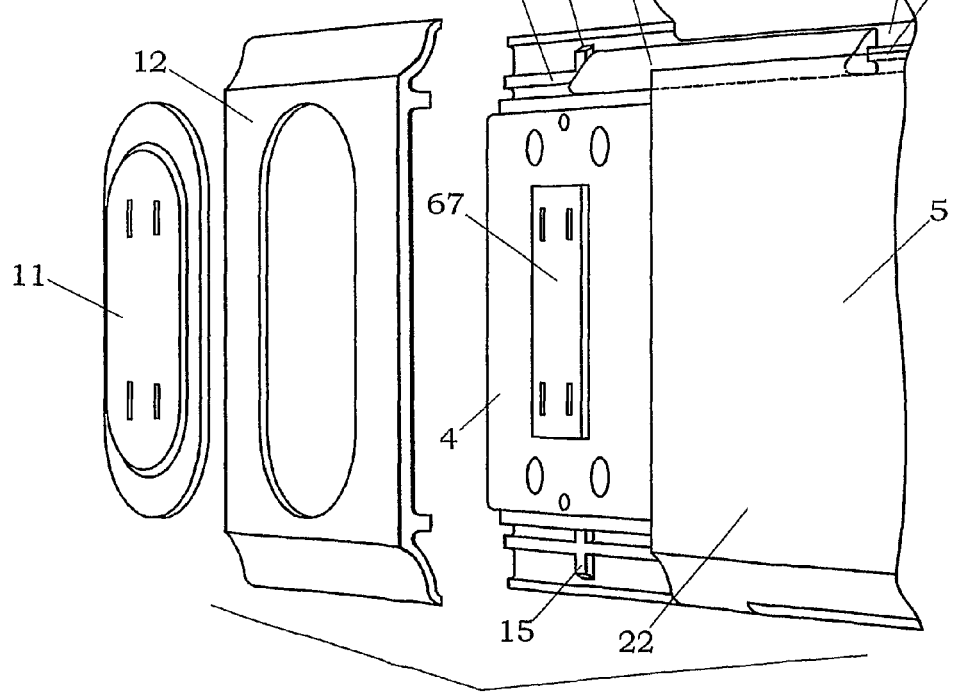
FIG. 10A is an exploded perspective view illustrating how to connect the additional function unit to the function unit.

The additional function unit 5 can be attached to the function unit 4, as shown in FIG. 10A. That is, the cosmetic cover 12 is firstly removed from the function unit 4. In this embodiment, since the receptacle cover 11 is separately formed from the cosmetic cover 12, the function section 67 such as the power receptacle can be protected from an accidental breakage by the receptacle cover 11 during the connecting and disconnecting operation for the additional function unit 5. After the additional function unit 5 is arranged on the side surface of the function unit 4 such that the electromagnetic coupling portion X and the optical coupling portion Y of the additional function unit 5 are in the face-to-face relation with them of the function unit 4, the additional function unit 5 is mechanically coupled to the function unit 4 by use of a joining member 90. The housing (10, 20) of each of the function unit 4 and additional function unit 5 has horizontal guide rails (14, 24) at its upper and lower end portions. The numeral 15 designates a stopper wall formed at a substantially center position in the longitudinal direction of the guide rail 14. On the other hand, as shown in FIG. 10B, the joining member 90 has a groove 92, in which the guide rails (14, 24) can be fitted.

As shown in FIG. 10A, on the condition that the guide rail 14 is fitted in the groove 92, a slide movement of the joining member 90 is performed until the joining member 90 contacts the stopper wall 15. As a result, the joining member 90 is engaged to the function unit 4 over about half length of the joining member. On the other hand, the joining member 90 is also engaged to the additional function unit 5 in a similar manner to the above over the remaining length of the joining member. Thus, after the engagements between the joining member 90 and the function unit 4 and between the joining member 90 and the additional function unit 5 are finished at both of the upper and lower end portions, cosmetic covers (12, 22) are attached to the front surfaces of the function unit and the additional function unit. Since the joining member 90 is held between the cosmetic covers (12, 22) and the housings (10, 20) of the function unit 4 and the additional function unit 5, it is possible to prevent accidental falling of the joining member 90, and obtain the stable mechanical connection therebetween without spoiling the beauty of them.

The followings are modifications of means for obtaining the stable mechanical connection between the function unit 4 and the additional function unit 5 or between the additional function units 5.

Figures 11A, 11B:
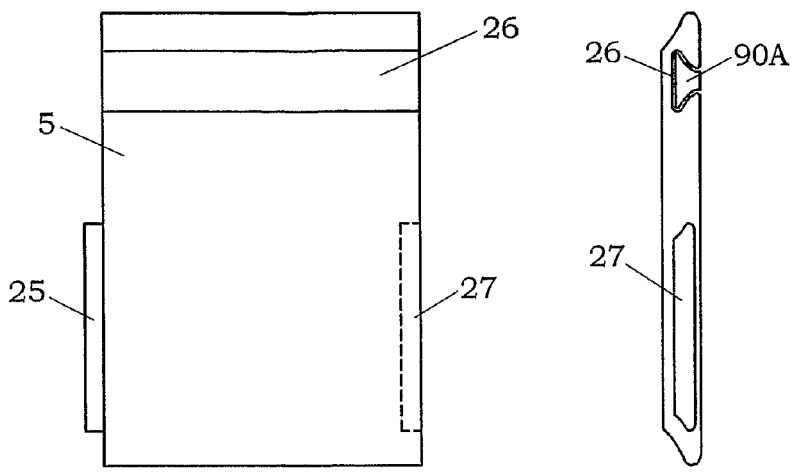
FIGS. 11A and 11B are front and side views of the additional function unit according to a first modification of the embodiment.
Figure 11C:
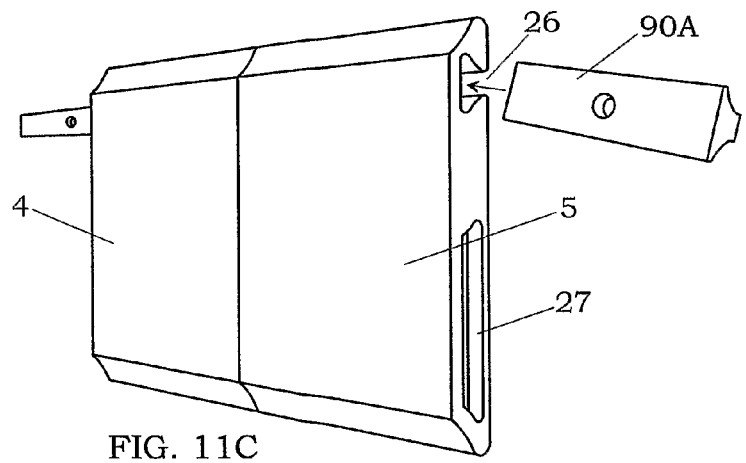
FIG. 11C is a perspective view illustrating how to use the joining member.

As shown in FIGS. 11A to 11C, the additional function unit 5 according to a first modification of this embodiment has a pair of male and female connectors (25, 27) at its both sides, each of which is comprised of the electromagnetic coupling portion X and the optical coupling portion Y. For example, the male connector 25 is detachably connected to a female connector formed at the function unit 4, and the female connector 27 is detachably connected to a male connector formed on another additional function unit 5. In addition, this additional function unit 5 has a horizontal groove 26, in which a joining member 90A having in a similar cross section to the groove 26 can be fitted. As in the case of the joining member 90 of FIG. 10B, one end of the joining member 90A is inserted into the groove 26 of the additional function unit 5 over about half length of the joining member, and also the other end of the joining member 90A is inserted into a groove formed at an adjacent function unit 4 or another additional function unit 5 over the remaining half length of the joining member to provide the stable mechanical connection therebetween.

In this modification, since the groove 26 has a substantially trapezoidal section configured such that an opening formed at the rear surface of the additional function unit 5 corresponds to a narrow side of the trapezoidal section, the falling of the joining member 90A from the groove 26 can be prevented without using the cosmetic cover. In addition, the user can be accessed to the joining member 90A through the opening of the rear surface of the additional function unit 5, it is possible to easily perform the slide movement of the joining member 90A in the groove 26. The shape of the groove is not limited to the trapezoidal section on the condition that the joining member 90A can not removed from the opening formed at the rear surface of the additional function unit 5.

Figures 12A, 12B:
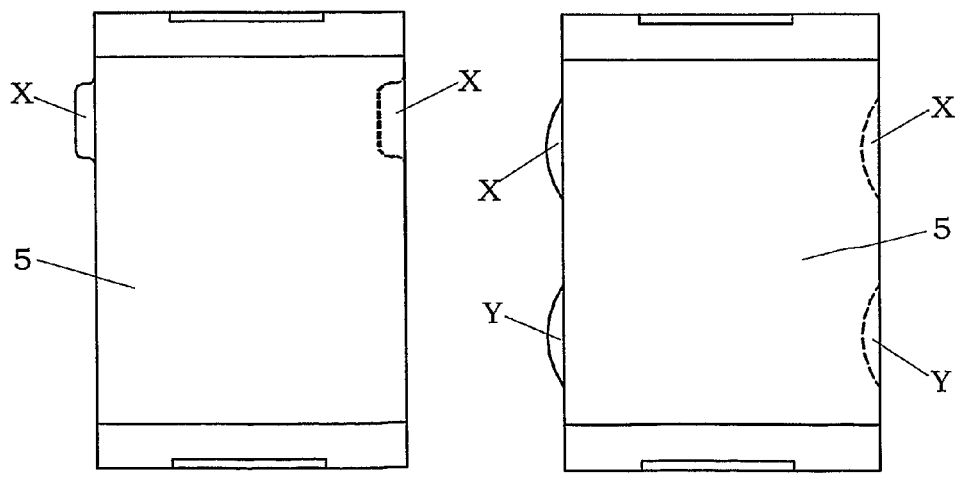
FIGS. 12A and 12B are front views of another additional function units.

As shown in FIG. 12A, only the electromagnetic coupling portion X may be formed by the female and male connectors. To ensure the function expandability of the additional function unit 5, when the male connector is provided at one side of the additional function unit, the female connector is provided at the other side thereof. Alternatively, as shown in FIG. 12B, each of the electromagnetic coupling portion X and the optical coupling portion Y may be formed by female and male connectors configured in arcuate recess and projection. Thus, when the use of the female and male connectors provides accurate positioning between the adjacent additional function units, and consequently the reliability of the supply of electric power and the input and output of the information signal is improved.

Figure 13A:
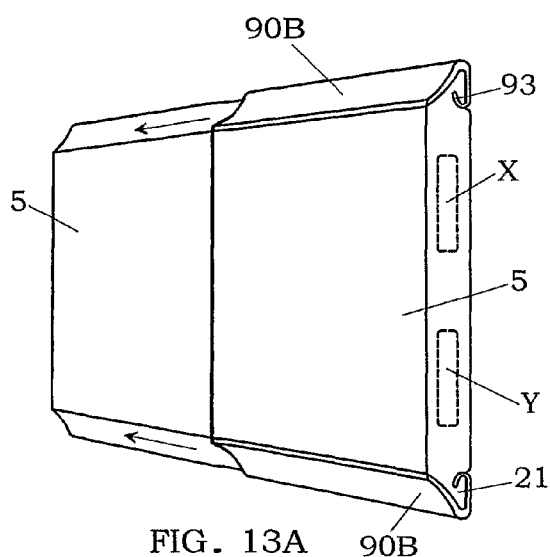
FIGS. 13A and 13B are perspective views illustrating how to make a connection between the additional function units according to a second modification of the embodiment.
Figure 13B:
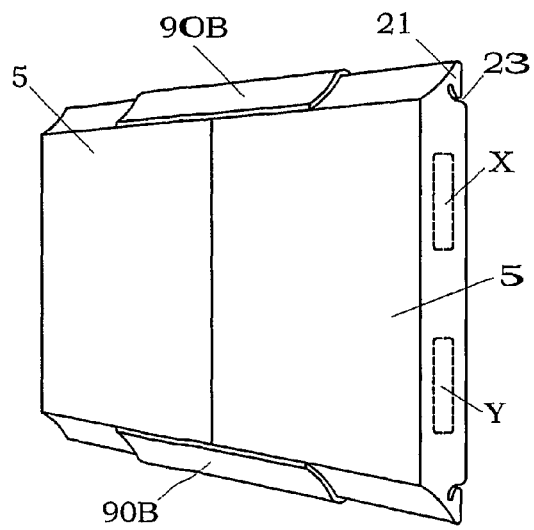

As a second modification of this embodiment, it is preferred that each of the upper and lower end portions of the additional function units 5 has a tapered end 21 with an engaging groove 23, and a joining member 90B is configured to slidably contact the tapered end 21 and have a hook 93 at its one end, which can be fitted in the engaging groove 23, as shown in FIG. 13A. In this case, after the joining member 90B is fitted to the tapered end 21 at each of the upper and lower ends of the additional function unit, the joining member 90B is slid toward an adjacent additional function unit, as shown by the arrows in FIG. 13A. As a result, the stable mechanical connection between the adjacent additional function units 5 can be obtained by use of this joining member 90B, as shown in FIG. 13B.

Figure 14A:
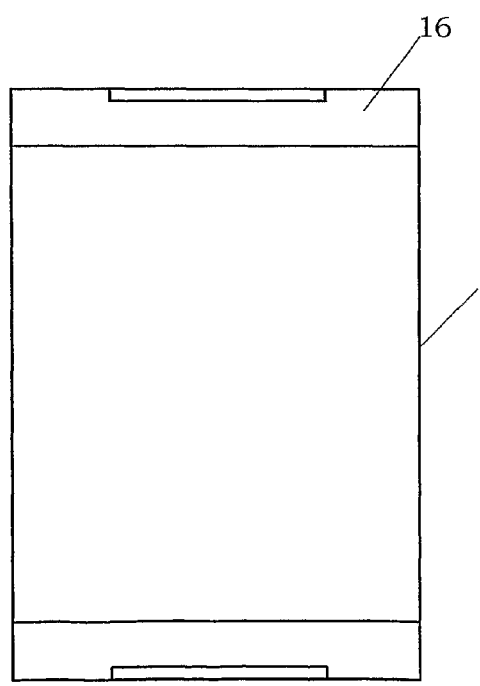
FIGS. 14A to 14C are front and side views of the additional function unit according to a third modification of the embodiment.
Figure 14B:
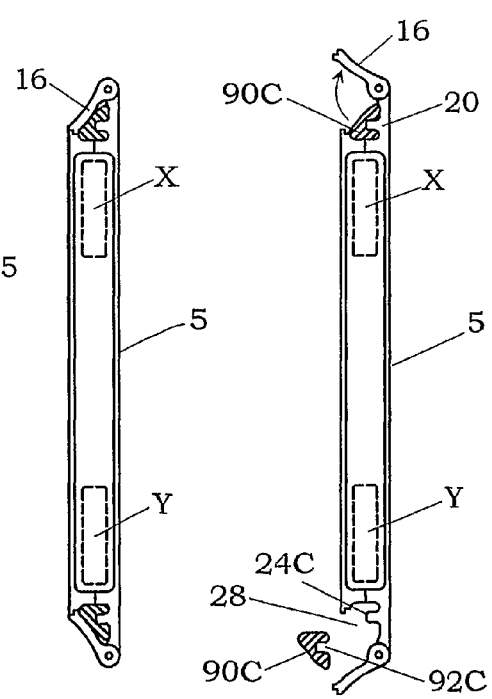
Figure 14C:
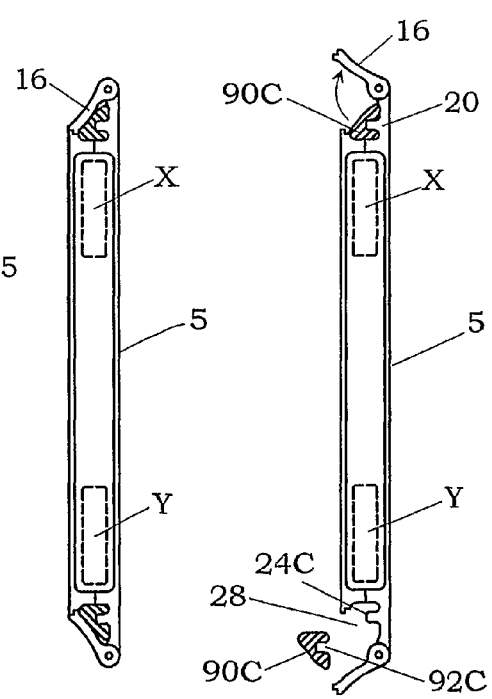

As a third modification of this embodiment, it is preferred that each of the upper and lower end portions of the additional function unit 5 has a concave portion 28 for accommodating a joining member 90C, and a cover member 16 pivotally supported at its one end to the housing 20 of the additional function unit 5, as shown in FIGS. 14A to 14C. The joining member 90C has a groove 92C, in which a guide rail 24C formed in the concave portion 28 can be slidably fitted. In this case, after the cover member 16 is opened to access the joining member 90C, the joining member is slid along the guide rail 24C, as in the case of FIG. 10A. Finally, the cover is closed to obtain the stable mechanical connection between the adjacent additional function units 5. In addition, since the joining member 90C is always accommodated in the concave portion 28, there is no worry about loss of the joining member.

As an information-signal transmitting method available in the dual wiring system of the present invention, one of baseband transmission and broadband transmission can be used. In addition, the protocol is not limited to a specific one. For example, sound and visual information signals may be transmitted and received according to JT-H232 packet to make the mutual communication between the base unit and the handset of the intercom system. In a control system, it is also preferred to use a routing protocol for a broadcast or a unicast that controlling can be performed at a control ratio of 1:1 or 1:N according to operation data. Alternatively, it is preferred that the protocol used between the gate devices is different from the protocol used in the function unit connected to the gate device, and a protocol conversion is performed at the gate device.

As shown in FIG. 1, since the function units 4 having the various kinds of functions have the common module connector 42 detachably connectable to each of the gate devices 3, and both of the power supply from the gate device 3 to the function unit 4 and the mutual communication of the information signal between the gate device 3 and the function unit 4 can be simultaneously obtained by the connection between the module port 34 and the module connector 42, a general user can easily exchange the function unit 4 already connected to one of the gate devices 3 for another one of the function units without performing a laborious repair work. In addition, when at least one additional function unit 5 is connected to the function unit 4 along the wall surface, the function expandability can be further improved without spoiling the beauty in the interior spaces. Thus, the function unit for dual wiring system of the present invention is effective to provide comfortable and convenient living and working environments to meet the user's needs in the information society.

The invention claimed is:

1. A plurality of function units for dual wiring system, comprising
a first function unit which is adapted in use to be detachably connected to a gate device mounted in a wall surface of a structure, and
a second function unit configured to be connected to said gate device via said first function unit,
said gate device being connected to both of an electric power line and an information line installed in said structure,
wherein the first function unit has a function section, one of a module connector and a module port, which is configured to simultaneously establish both of receiving the electric power from said electric power line, and making a signal transmission between said information line and the first function unit for at least one of outputting an information from said information line and inputting an information to said information line when connected to the other one of said module connector and said module port formed in said gate device,
wherein the first function unit further comprises in its lateral face one of an electric power port and an electric power connector, which is detachably connected to the other one of said electric power port and said electric power connector formed in the second function unit to supply the electric power from the first function unit to the second function unit,
wherein the first function unit further comprises in its lateral face one of an information signal port and an information signal connector which is spaced from one of said electric power port and said electric power connector at a predetermined interval and detachably connected to the other one of said information signal port and said information signal connector formed in the second function unit to make a signal transmission between the first function unit and the second function unit,
wherein said second function unit has a function section, and comprises in its lateral face the other of said electric power port and said electric power connector,
wherein said second function unit further comprises in its lateral face the other of said information signal port and an information signal connector which is spaced from said other of said electric power port and said electric power connector at a predetermined interval, and
wherein said first function unit and said second function unit are connected with each other in a direction along said wall surface.

2. The function units as set forth in claim 1, wherein said electric power port and said electric power connector are configured to supply the electric power from the first function unit to the second function unit by means of electromagnetic coupling, and said information signal port and said information signal connector are configured to make the signal transmission between the first function unit and the second function unit by means of optical coupling.

3. The function units as set forth in claim 1, wherein said first function unit further comprises a transceiver unit configured to convert the information signal provided by the connection between said module connector and said module port into an optical signal and transmit the optical signal to an electric appliance, and convert an optical signal provided from outside into an information signal and transmit the information signal to said information line through said gate device.

4. The function units as set forth in claim 1, wherein said first function unit further comprises a power supply unit configured to supply the electric power provided by the connection between said module connector and said module port to an electric appliance by means of electromagnetic coupling.

5. The function units as set forth in claim 1, wherein said first function unit further comprises a joining means configured to mechanically connect the second function unit to the first function unit.

6. The function units as set forth in claim 5, wherein said joining means comprises an engaging portion formed on the first function unit, and a joining member configured to slidably contact said engaging portion and make the mechanical connection between the first function unit and the second function unit when a region of said joining member is engaged said engaging portion of the first function unit and the remaining region of said joining member is engaged to an engaging portion formed on the second function unit.

* * * * *